United States Patent
Manoliu et al.

(10) Patent No.: US 10,527,432 B2
(45) Date of Patent: Jan. 7, 2020

(54) METHODS AND SYSTEMS FOR GENERATING A HORIZON FOR USE IN AN ADVANCED DRIVER ASSISTANCE SYSTEM (ADAS)

(71) Applicant: TomTom Navigation B.V., Amsterdam (NL)

(72) Inventors: Adrian-Victor Manoliu, Amsterdam (NL); Alexandru Serbanescu, Amsterdam (NL); Sergey Yuryevich Trofimov, Utrecht (NL); Alexander Raginsky, Amsterdam (NL); Stanislav Zheltov, Amsterdam (NL); Lauri Koponen, Amsterdam (NL); Johannes G. M. Schaminee, Amsterdam (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 197 days.

(21) Appl. No.: 15/663,927

(22) Filed: Jul. 31, 2017

(65) Prior Publication Data

US 2017/0328720 A1 Nov. 16, 2017

Related U.S. Application Data

(63) Continuation of application No. 14/440,089, filed as application No. PCT/EP2013/072880 on Nov. 1, 2013, now Pat. No. 9,726,505.

(30) Foreign Application Priority Data

Nov. 2, 2012 (GB) .................................. 1219742.2

(51) Int. Cl.
*G01C 21/26* (2006.01)
*B60R 16/023* (2006.01)
(Continued)

(52) U.S. Cl.
CPC ............ *G01C 21/26* (2013.01); *B60R 16/023* (2013.01); *B60T 7/12* (2013.01); *G01C 21/32* (2013.01);
(Continued)

(58) Field of Classification Search
CPC .... G01C 21/26; G01C 21/3484; G01C 21/32; B60T 7/12; B60R 16/023; G08G 1/16; B60W 2550/402; B60W 2550/20; B60W 30/18154; B60W 30/18145; B60W 30/10; B60W 50/0097; B60W 2550/143
See application file for complete search history.

(56) References Cited

U.S. PATENT DOCUMENTS 6,184,823 B1 2/2001 Smith et al.
6,405,128 B1 * 6/2002 Bechtolsheim .... G01C 21/3667
340/988

(Continued)

FOREIGN PATENT DOCUMENTS

CN 103256934 A 8/2013
DE 102013202345 A1 8/2013
(Continued)

*Primary Examiner* — Nga X Nguyen

(57) ABSTRACT

A method of generating a horizon for use by an ADAS of a vehicle involves using digital location-based data, driver data and/or vehicle data to determine the likelihood that different outgoing paths are taken at a decision point along a currently traversed road segment, and deriving a probability that each path may be taken. The probability may be based on one or more of: an angle of the path relative to the incoming path, the road class of the path, a speed profile of the path, historical paths taken by vehicles at the decision point, and historical paths taken at the decision point by the individual driver or vehicle.

19 Claims, 5 Drawing Sheets

(51) Int. Cl.
  *B60T 7/12*     (2006.01)
  *G01C 21/32*    (2006.01)
  *G01C 21/34*    (2006.01)
  *G08G 1/16*     (2006.01)
  *B60W 30/10*    (2006.01)
  *B60W 30/18*    (2012.01)
  *B60W 50/00*    (2006.01)

(52) U.S. Cl.
  CPC ........... *G01C 21/3484* (2013.01); *G08G 1/16* (2013.01); *B60W 30/10* (2013.01); *B60W 30/18145* (2013.01); *B60W 30/18154* (2013.01); *B60W 50/0097* (2013.01); *B60W 2550/143* (2013.01); *B60W 2550/20* (2013.01); *B60W 2550/402* (2013.01)

(56) References Cited

U.S. PATENT DOCUMENTS

| | | | |
|---|---|---|---|
| 2013/0218367 A1 | 8/2013 | Shikimachi | |
| 2013/0245945 A1 | 9/2013 | Morita | |
| 2014/0081563 A1* | 3/2014 | Wang | ............... F01N 9/007 |
| | | | 701/113 |
| 2017/0038941 A1 | 2/2017 | Pylappan et al. | |

FOREIGN PATENT DOCUMENTS

| | | |
|---|---|---|
| JP | H10169763 A | 6/1998 |
| JP | 2002260192 A | 9/2002 |
| JP | 2006224904 A | 8/2006 |
| JP | 2006284254 A | 10/2006 |
| JP | 2008114778 A | 5/2008 |
| JP | 2013170818 A | 2/2013 |
| WO | 2012114382 A | 7/2014 |

* cited by examiner

METHODS AND SYSTEMS FOR GENERATING A HORIZON FOR USE IN AN ADVANCED DRIVER ASSISTANCE SYSTEM (ADAS)

RELATED APPLICATIONS

The instant application is a continuation of, and hereby claims priority to, pending U.S. patent application Ser. No. 14/440,089, which was filed on 1 May 2015. The instant application also claims priority to international application no. PCT/EP2013/072880, which was filed on 1 Nov. 2013, and to which parent application Ser. No. 14/440,089 claims priority. The instant application further claims priority to U.K. patent application no. 1219742.2, which was filed on 2 Nov. 2012, and to which grandparent application PCT/EP2013/072880 claims priority. Each of these applications is incorporated by reference.

FIELD OF THE INVENTION

The present invention relates to methods and systems for generating a horizon for use in an Advanced Driver Assistance System (ADAS) of a vehicle.

BACKGROUND TO THE INVENTION

Advanced Driver Assistance Systems are increasingly used in vehicles to provide assistance to drivers in areas such as braking, collision avoidance, and speed selection. Such systems may help to reduce driver workload, and may be useful in improving safety, vehicle operating efficiency, driver comfort and/or fuel efficiency.

Operation of an ADAS relies upon knowledge of the road ahead, and its properties. For example, the ADAS may take into account factors such as the curvature or gradient of a section of the road ahead in order to determine a suitable speed for traversing the section, and may then, for example, control the braking subsystems of the vehicle in order to implement the determined speed. Typically a subsystem of the ADAS, which may be known as an ADAS horizon provider subsystem, communicates with ADAS applications of a vehicle network over a vehicle bus, such as a Controller Area Network (CAN) bus, in order to control vehicle subsystems. Different ADAS applications may control different respective vehicle subsystems in accordance with the information received from the ADAS horizon provider over the vehicle bus. For example, there may be ADAS applications in respect of braking, suspension, etc. The ADAS horizon provider subsystem provides ADAS horizon information which may be used by the ADAS applications associated with given vehicle subsystems to provide control of the respective vehicle subsystems using the ADAS horizon data.

One aspect of the operation of the ADAS horizon provider subsystem relates to the generation of a suitable ADAS "horizon" for communication over the vehicle bus to the vehicle subsystems. The ADAS horizon comprises digital map information about a portion of the road network ahead, which is used by the ADAS applications to implement ADAS functionality with respect to the vehicle subsystems. Determination of the ADAS horizon involves predicting the path or paths that the vehicle may travel in the immediate future, to ensure that the necessary data is transmitted over the vehicle bus to allow implementation of ADAS functions by the vehicle subsystems as the vehicle travels.

The ADAS horizon may include information about the course of a road ahead, and associated attributes of the road, such as curvature, gradient, etc which may be used by ADAS applications of the vehicle to implement ADAS control of the vehicle subsystems. ADAS applications associated with different vehicle systems may filter the provided ADAS horizon data to extract the information required for controlling their relevant subsystem. For example, road curvature data may be extracted for use in controlling the braking system.

When determining a suitable portion of the road network ahead for inclusion in the ADAS horizon, it is necessary to balance providing sufficient data to ensure that ADAS functionality may be adequately implemented by vehicle systems while avoiding overloading the vehicle ADAS applications associated with the vehicle systems. The prediction of the path or paths that the vehicle may be expected to travel in the near future is therefore fundamental to the generation of a suitable ADAS horizon. The determination of a suitable ADAS horizon may involve certain challenges, for example depending upon whether the vehicle is following a pre-calculated route or not, and to accommodate potential deviations of a vehicle from a pre-calculated route. For example, in a simple case, the ADAS horizon may comprise data relating only to the road currently being traversed up to a predetermined distance from a current position. However, in such situations, the ADAS applications may be left "blind" for a time if the driver deviates from the road currently being traversed until a new ADAS horizon can be generated in relation to the newly traversed road section.

The Applicant has realised that there is a need for improved methods and systems for generating a horizon for use by an ADAS, and in particular, for predicting a path or paths that a vehicle may travel in the immediate future when generating an ADAS horizon.

SUMMARY OF THE INVENTION

In accordance with a first aspect of the invention there is provided a method of generating a horizon for use in an ADAS of a vehicle, comprising:

generating the horizon using one or more of: stored digital location-based data, vehicle data and driver data.

Thus, in accordance with the invention, generation of an ADAS horizon involves using stored digital location-based data and/or vehicle data and/or driver data.

In accordance with a second aspect of the invention there is provided a system for generating a horizon for use in an ADAS of a vehicle, the system comprising:

means for generating the horizon using one or more of; stored digital location-based data, vehicle data or driver data.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the data indicative of the generated horizon, and/or the data used in determining the horizon, i.e. the vehicle data, driver data and/or digital location-based data. The means for generating the horizon may be a horizon generating subsystem of an ADAS system.

As used herein, the term "horizon" refers to a driving horizon for use by an ADAS of a vehicle. The horizon includes a prediction of one or more paths that the vehicle may travel in the immediate future through a portion of a road network or data enabling such a prediction to be made. The road network comprises a plurality of road segments connected by nodes and is represented by digital map data indicative of each road segment and node, i.e. decision point. In preferred embodiments the horizon comprises data indicative of the relative probability that each of a plurality of paths may be taken by the vehicle at a decision point. The horizon may comprise digital map data indicative of the or each predicted path and/or data indicative of one or more attributes of the or each predicted path. This may allow data about an upcoming portion of the road network to be obtained in advance before the vehicle reaches the relevant portion, to enable the ADAS to function. The portion of the road network may be defined by a boundary of the horizon.

By using stored digital location-based data, vehicle data and/or driver data to generate the ADAS horizon, it has been found that a useful horizon containing data necessary for appropriate guidance of the vehicle may be obtained. In particular, the use of such data has been found to allow the relative probability that each of a plurality of possible paths may be taken at a decision point to be more reliably determined. This may allow more accurate prediction of paths that may be taken by the vehicle to be made, resulting in more reliable operation of an ADAS system of the vehicle based on the ADAS horizon, even where the vehicle diverges from an expected most probable path.

The generated horizon may extend from a current position of a vehicle to a predetermined distance ahead of the current position defining a boundary of the horizon. The ADAS horizon may extend to the predetermined distance from the current vehicle position along the or each predicted path. The distance may be up to 500 m, or up to 200 m and/or at least 100 m. A given distance ahead of a current position refers to a distance in the current direction of travel. The extent of the horizon may be chosen as desired for a given application. The horizon may extend to a given radius corresponding to the distance in the direction of travel, e.g. through a 180 degree angle in the forward direction of travel.

As used herein, a "path" may comprise at least a portion of one or more road segments. A path is representative of a trajectory that may be taken by a vehicle through the road network. A path is a path defined by at least a portion of one or more road segments of a digital map. The digital map comprises a plurality of segments representative of road segments of a road network.

In accordance with the invention stored digital location-based data, vehicle data and/or driver data are used to generate the horizon. Preferably at least stored digital location-based data is used. One or both of stored vehicle and driver data may additionally be used. Where not explicitly stated, and unless the context demands otherwise, it will be appreciated that any combination of stored digital location-based data, vehicle data and/or driver data may be used.

The digital location-based data is, in preferred embodiments, digital map data.

In embodiments, the stored digital map data is representative of a plurality of road segments of a road network, the data representative of each road segment being associated with data indicative of one or more road segment attributes. The method may comprise using the attribute data associated with the road segment data to generate the horizon.

Attribute data associated with data representative of a road segment, and which may be used in generating the or each path, includes attribute data indicative of inherent properties of the road segment and/or indicative of vehicle flow along the segment. Vehicle flow attribute data may be historic vehicle flow data, and may comprise vehicle speed profile data. The data may be time dependent i.e. in respect of a given time period.

Attribute data of a road segment which may be used in generating the horizon may include data indicative of one or more of: a geometry of the road segment, a gradient of the road segment, an angle of the road segment, a road class of the segment, a speed limit associated with the segment (whether recommended or legal), vehicle flow data indicative of vehicle flow along the segment, and vehicle speed profile data.

Generation of the horizon may be based upon absolute values of attributes associated with the or each road segment. However, in some preferred embodiments the generation of the horizon is alternatively or additionally based on a comparison of an attribute or attributes of a road segment to the corresponding attribute or attributes of one or more other road segments. Thus the relative values of an attribute or attributes may be considered. For example, the relative values of attributes of any of the types discussed above, such as road class, gradient, angle, speed limit, speed profile etc. may be considered. The method may comprise comparing the data indicative of an attribute or attributes of one road segment with the corresponding attribute data of another road segment or segment in generating the horizon.

Digital location-based data that is used in embodiments of the invention may also relate to historical paths taken by vehicles e.g. based on vehicle "probe data" (as described in below detail below).

The vehicle or driver data is preferably stored vehicle or stored driver data. The data preferably relates to the individual vehicle having the ADAS for which the horizon is generated, and/or the individual driver of the vehicle. The vehicle data may comprise data indicative of one or more parameters of the vehicle or driver. Vehicle data which may be used in generating the horizon may include data indicative of one or more of: vehicle type, vehicle speed, historical movements of the vehicle, e.g. a turn history of the vehicle, frequency of travel of the vehicle along a given segments of a road network, etc. The driver data may include data indicative of the past behaviour of the driver, e.g. a turn history of the driver, etc.

The vehicle data may, in preferred embodiments, comprise data relating to the historical movements of the vehicle.

The vehicle data may, in other embodiments, comprise data indicative of a current movement of the vehicle, e.g. a speed, location or path traveled by the vehicle. Such data is preferably used in combination with digital location-based data in generating the horizon. Where the vehicle data is stored data the data preferably does not relate to the current movement of the vehicle.

It will be appreciated that certain parameters of the vehicle may be indicative of parameters of a driver, e.g. relating to past behaviour of the driver or turn history. Such parameters may be considered to be driver specific parameters of the vehicle. For example, an ADAS of a vehicle may collect data relating to the specific behaviour of a driver. Where a vehicle may have multiple drivers, this may be based upon movements of the vehicle where a particular driver has been identified. Thus, it will be appreciated that the vehicle parameters upon which generation of the ADAS horizon may be based, may or may not be driver specific parameters of the vehicle. In some cases driver specific data might be identified through a driver profile and may be indicative of the behaviour of the driver when driving other vehicles. Thus driver data may not necessarily be data relating to an individual vehicle.

In accordance with the invention, the step of generating the horizon using the stored digital location-based data, vehicle data and/or driver data, preferably comprises using the data to determine data indicative of the relative probability that each of a plurality of possible outgoing paths associated with a decision point will be taken by the vehicle in the immediate future.

It will be appreciated that the methods described herein in relation to a given decision point may be carried out in respect of any additional decision points of the road network as desired.

As used herein, the "relative probability" of a path of a set of a plurality of possible outgoing paths at a decision point being taken by a vehicle in the immediate future refers to the probability that the vehicle may be expected to take the path relative to the probability that the vehicle will take any of the other paths of the set of a plurality of possible outgoing paths at the decision point in the immediate future. References to a probable path or any other reference to probability or likelihood of a path should be understood to refer to the probability of the vehicle travelling along the path in the immediate future.

Preferably, for each respective possible outgoing path at the decision point, data is determined indicative of a relative probability that the path will be taken in preference to any other one of the possible outgoing paths. The method may comprise associating the relative probability data with data indicative of the path to which it relates and/or the decision point to which it relates.

It will be appreciated that the definition of an "outgoing" path, and indeed the relative probability that a given path will be taken, will depend upon the incoming path to the decision point. Accordingly the relative probability that each of the plurality of possible outgoing paths is taken is by reference to a given incoming path.

The method may comprise the step of determining an incoming path to the decision point with respect to which the outgoing paths are to be defined. The incoming path is a path along which the vehicle is expected to travel to reach the decision point. In preferred embodiments the incoming path is a continuation of a road segment along which the vehicle is currently travelling. Alternatively or additionally the path may be a portion of a known most probable path for the vehicle, such as a portion of a pre-calculated route. In these cases the portion of the known path is preferably an end portion of the known path which terminates at the decision point. However, these preferred embodiments of the invention may still be applied to determining the relative probability that each of a plurality of other paths may be taken at a decision point even where an outgoing path at the decision point corresponding to a portion of a pre-calculated route is known.

The decision point may be any decision point defining a plurality of possible outgoing paths for which it is desired to determine a relative probability associated with taking each of the possible paths. In embodiments the decision point is the next decision point to be encountered by the vehicle along a continuation of a currently traversed road segment. It may be assumed that the vehicle will continue along the currently traversed road segment at least until the next decision point is reached. Thus the path as far as the next decision point may be considered to be known.

In some embodiments the method comprises identifying a current location of the vehicle, determining a road segment along which the vehicle is currently travelling, and identifying the next decision point to be encountered. The method may then comprise determining the relative probability that each of a plurality of outgoing paths associated with the decision point will be taken in accordance with the methods of the invention.

It is envisaged that the preferred methods of determining the relative probabilities associated with paths at a decision point may be carried out "on the fly". Thus, preferably the decision point is an upcoming decision point or next decision point to be encountered. Nonetheless, it is envisaged that the method could be carried out with respect to any decision point of a road network, or could be applied to determining relative probability values in advance that could be stored in association with data identifying each decision point to which they relate in a database or similar for subsequent use as desired. In this case, the incoming path with respect to which the outgoing path(s) are defined may be arbitrarily chosen, and data may be obtained for a given decision point in respect of multiple possible incoming paths.

In any of its embodiments, the method may comprise selecting a decision point, and determining an incoming path and a plurality of outgoing paths associated with the decision point for which relative probabilities are to be determined.

The decision point may be any type of decision point at which two or more possible outgoing paths exist for a given incoming path. The decision point may be any form of intersection, roundabout, junction, crossing, divergence of a path, etc. The term "decision point" as used herein also encompasses a plural junction where individual junctions are close together. In these cases paths emanating from each junction may be considered to approximately emanate from a single decision point, and may be treated as such.

The method preferably involves determining data indicative of a relative probability that each of a set of two or more possible outgoing paths will be taken by the vehicle at the decision point (for a given incoming path). Preferably the method comprises determining relative probability data in respect of every possible outgoing path present at the decision point in respect of the given incoming path. An outgoing path may be defined as any path originating from the decision point other than the incoming path. The possible outgoing paths may or may not include all potential outgoing paths associated with the decision point, and certain paths may be excluded from consideration for various reasons e.g. as they are considered to be in a direction close to that opposite to the direction of travel, are below a significance threshold, etc. For example, the path corresponding to the incoming path but in the opposite travel direction may not be considered for a junction, but may be considered for a roundabout. Such paths that are not considered are not deemed to be "possible" outgoing paths. Unless the context demands otherwise, references herein to an "outgoing path" should be understood to refer to a "possible outgoing path". The methods of the present invention are therefore carried out with respect to a set of a plurality of possible outgoing paths at the decision point. The set of the plurality of possible outgoing paths are those paths for which relative probability data is desired to be determined, i.e. which paths are considered relevant paths for a given application.

In some embodiments in which one of the possible outgoing paths at the decision point is known to correspond to a portion of a pre-calculated route, the method may comprise excluding that outgoing path from the set of plurality of outgoing paths whose relative probabilities are determined, or adjusting the calculations appropriately to ensure that this route is determined to be the most probable. This may be done by assigning the path corresponding to the route a probability of one and, for example, adjusting the probabilities of the other paths accordingly, or by adjusting the relative probabilities of the other paths such that none is higher than that of the path corresponding to the route.

The step of determining the data indicative of a relative probability that each possible outgoing path of a plurality of paths may be taken by the vehicle may comprise ranking each path according to the likelihood that the vehicle may be expected to travel along the path in preference to any other one of the paths of the set of a plurality of possible outgoing paths. Thus, the relative probability may be in terms of a qualitative ordering of the paths. In other embodiments the step may comprise determining a probability factor in respect of each possible outgoing path indicative of the relative probability that the path will be taken in preference to any other one of the paths. The probability factor provides a quantitative measure of the relative probability that the path will be taken.

The step of determining the data indicative of the relative probability that a given possible outgoing path may be taken may comprise using the stored digital location based data, vehicle data and/or driver data, as will be described in more detail below. The step of determining the relative probability of a given possible outgoing path may further comprise using data indicative of the incoming path that the vehicle is expected to travel to reach the decision point, attribute data associated with such a path and/or parameters of the vehicle as it travels along the incoming path (e.g. speed, acceleration, etc).

The method may comprise storing the determined data indicative of the relative probability that each possible outgoing path will be taken. The stored data may be indicative of a rank or probability factor for the path. The method may comprise storing data indicative of a relative probability that the path will be taken in preference to any other one of the paths for each possible outgoing path in association with data identifying the path. The method may further comprise storing data indicative of the incoming path with respect to which the outgoing paths are defined. The method may comprise storing the data indicative of the relative probability of a possible outgoing path being taken in association with data indicative of the decision point to which it relates, e.g. the location of the decision point. The location of the decision point may be in absolute terms or in relation to a distance along an, for example, most probable path, etc.

Some preferred embodiments of the invention will now be described illustrating the way in which different types of stored digital location-based, e.g. map data, vehicle data and/or driver data, may be used to determine the data indicative of the relative probability of each possible outgoing path being taken. It will be appreciated that any of these embodiments may be combined as desired. For example, determination of the relative probability associated with each possible outgoing path may involve consideration of one or more of: the angle and/or road class of possible outgoing paths, past paths taken by a driver and/or vehicle, current vehicle speed, average speed associated with a path, and data indicative of the probability that paths were selected historically based on "probe data". A suitable probability function indicative of the relative probability of a path may be constructed to take account of any or all of these factors, and with an appropriate weight assigned to each as desired.

The digital location-based data, e.g. digital map data, where used may be data relating to a road segment defining the initial portion of the relevant outgoing path as it extends away from the decision point.

In some embodiments the step of determining the relative probability data for each of the possible outgoing paths may comprise using stored digital map data. In these embodiments the step of determining the relative probability that different possible outgoing paths will be taken may comprise using attribute data associated with road segments defining at least the initial portion of the outgoing paths at a decision point. The attribute data may be of the any of the types discussed above. The attribute data may be used directly or may be used to determine other data based thereon which is used in the determination.

In certain embodiments the method comprises determining the data indicative of a relative probability that each of the possible outgoing paths will be taken at the decision point using data indicative of one or both of an angle defined between the outgoing path and the incoming path and road class of the outgoing path.

The angle data may be determined using stored digital map data. For example, the angle data may be determined using attribute data associated with data indicative of the road segment defining (at least the initial portion of) the possible outgoing path and optionally also the incoming path, or data derived therefrom. The angle data may be determined indirectly using data indicative of the trajectory of each road segment or data relating to the angle of the segment defining the outgoing path with respect to the decision point, etc The road class is indicative of the relative importance of the road, and may be a functional road class. According to standard definitions, a road may be classified such that a higher road class is indicative of a relatively less significant road. In other words, a highway or motorway has a lower functional road class than a minor road.

In embodiments the method comprises determining that a possible outgoing path is relatively more probable, i.e. there is a relatively higher likelihood that the vehicle will take the path in preference to each other possible outgoing path, when the outgoing path is associated with a relatively lower angle relative to the incoming path and/or when associated with a road class indicative of relatively greater significance.

The determination may be based on any function of the angle and/or road class. Where the determination is based on a function of both angle and road class, the function may be adapted as appropriate to weight the contribution of angle or road class to the determination as desired.

In embodiments the method comprises determining the data indicative of a relative probability that each of the possible outgoing paths will be taken at the decision point using data indicative of whether a manoeuvre at a decision point is deemed a "priority manoeuvre" in the digital map data. For example, a complicated manoeuvre at a junction may also be a common manoeuvre, and is marked as a special case in the digital map data for the junction. A manoeuvre from an incoming path to an outgoing path denoted as a priority manoeuvre in the digital map data may be, and preferably is, deemed relatively more probable than it would otherwise based on, for example, the angle defined between the outgoing path and the incoming path and road class of the outgoing path.

Similarly, embodiments of the method may, additionally or alternatively, comprise determining the data indicative of a relative probability that each of the possible outgoing paths will be taken at the decision point using data indicative of whether a manoeuvre at a decision point is deemed a "discouraged manoeuvre" or an "illegal manoeuvre" in the digital map data. For example, a sequence of manoeuvres at a plurality of sequential decision points, e.g. junctions, may be marked as an illegal manoeuvre in the digital map data, and can be assigned a zero, or close to zero, probability when generating the horizon. A "discouraged manoeuvre" is the converse of the "priority manoeuvre" mentioned above, and refers to an manoeuvre that appears favourable, e.g. based on the angle defined between the outgoing path and the incoming path and road class of the outgoing path, but is in reality dangerous or not commonly used. A manoeuvre from an incoming path to an outgoing path denoted as a discouraged manoeuvre in the digital map data may be, and preferably is, deemed relatively less probable than it would otherwise based on, for example, the angle defined between the outgoing path and the incoming path and road class of the outgoing path.

Alternatively or additionally, the data indicative of the relative probability that each of the possible outgoing paths will be taken is determined based on data indicative of historical paths taken by the individual driver and/or vehicle at the decision point. The data is specific to the given decision point. The data is specific to an individual driver and/or vehicle. Knowledge of past behaviour of the driver or travel of a vehicle may enable predictions about future behaviour/travel, and hence future paths, to be more accurately made.

In this regard, it is envisaged that as a driver may use multiple vehicles, the historical path data may be obtained by reference to an individual driver profile, and may be assumed to be applicable whenever the driver is driving a vehicle. In other embodiments, the data may be specific to a vehicle regardless of who the driver may be. In many cases, where a vehicle is always driven by the same driver, there will be no difference between the historical travel of the vehicle or driver. These embodiments may be used in addition to consideration of factors based on stored digital map data, such as the angle and/or class of paths.

The historical path data is indicative of a historic probability of each of the plurality of possible outgoing paths being taken by the driver and/or vehicle at the decision point with respect to the incoming path. The data may be historic probability data or data allowing historic probability data to be determined. The data may, for example, comprise data indicative of a frequency that each of the paths was taken. For example, it may be determined from frequency data that the driver/vehicle has taken outgoing path 1 at a given decision point 70% of the time previously when approaching along incoming path 2. The method may comprise selecting data relating to each incoming-outgoing path combination to be considered from historical data relating to paths taken by the vehicle and/or driver at the decision point. Thus, the historical path data may include data relating to other incoming-outgoing path combinations for the decision point.

The method may comprise associating a relative probability that a given outgoing path will be taken in dependence upon a historic relative probability of the path having been taken by the driver and/or vehicle. A relatively higher probability may be associated with a path having a relatively higher probability of having been taken historically by the individual driver and/or vehicle.

Data relating to historical paths traveled by the vehicle and/or driver may be obtained, for example, from the ADAS of the vehicle or a navigation device associated therewith.

In some embodiments the method further comprises obtaining the data indicative of the historic paths taken by the driver and/or vehicle at the decision point. In some embodiments the method comprises determining such data from a database indicative of historic paths taken by the driver and/or vehicle at each of a plurality of decision points in the road network. The database may comprise data indicative of the historic paths taken in association with data indicative of the location of the or each decision point.

The method extends to the step of generating and/or providing such a database. In embodiments the method comprises obtaining and storing data indicative of a frequency with which each of a plurality of different possible outgoing paths at one or more, and preferably a plurality of, decision points of a road network have been taken by an individual driver and/or vehicle with respect of at least one possible incoming path, and preferably with respect to a plurality of, or each possible incoming path for the or each decision point. For example, each path associated with a given decision point may be assigned an identifier, and a matrix constructed identifying a frequency with which the driver or vehicle has traveled across the decision point for each of a plurality of possible incoming paths to each of a plurality of possible outgoing paths.

The present invention thus extends to a data product comprising such a database.

While in some embodiments the or each determined path is determined based on data indicative of historic paths taken by an individual driver or vehicle, in other embodiments, or in addition, data indicative of historical paths taken by multiple vehicles may be used in determining the or each path (as is described in more detail below).

Alternatively or additionally, the method comprises determining the data indicative of a relative probability that each of the plurality of possible outgoing paths will be taken using speed profile data associated with road segments defining the respective paths. The speed profile is a speed profile based on data indicative of the historical speed of vehicles travelling along the road segment defining the at least the portion of the path extending from the decision point. Speed profile data may be an attribute associated with each road segment of the road network, and therefore may form part of the stored digital map data.

The digital map data representing a road segment defining a given path may be associated with data representative of a speed profile for the segment. The speed profile is preferably indicative of an average speed associated with the segment, and preferably the method comprises using average speed data indicated by the speed profile data associated with a road segment defining each possible outgoing path in determining the relative probability data. The speed profile may be associated with the segment as a whole, or data indicative of one or more speed profiles in respect of one or more positions along the segment may be associated with the segment. Thus, in these embodiments each of the outgoing paths that is considered may be represented by a road segment having speed profile data associated therewith. The speed profile data used in these embodiments may be time dependent. In embodiments speed profile data indicative of a speed profile for each of a plurality of different time periods may be associated with a given road segment. The method may further comprise selecting speed profile data from speed profile data associated with a given segment defining an outgoing or incoming path that relates to a period including the current time or an expected time at which the segment is to be traversed.

The method may comprise comparing speed data, e.g. average speed data, indicated by the speed profile data associated with the segments representing different ones of the possible outgoing paths to determine the data indicative of the relative probability that the path will be taken.

In some embodiments a relatively higher probability is associated with a path having a speed profile indicative of a relatively higher average speed associated therewith. A higher average speed according to the speed profile data may be indicative of a more significant road. Thus consideration of speed profile data may be used as an indirect way of assessing road class.

Alternatively or additionally, in other embodiments the method may comprise determining the relative probability that each of the plurality of possible outgoing paths will be taken by comparing speed profile data associated with the road segments representing each given path with a current speed of travel of the vehicle along the incoming path. Preferably the method comprises comparing a current speed of the vehicle along the incoming path to that of each possible outgoing path. In these embodiments a relatively higher probability may be associated with a possible outgoing path where a relatively smaller difference exists between an incoming current speed of the vehicle and the average speed associated with the outgoing path based on the speed profile data associated with the outgoing path. Thus, it may be assumed that an outgoing path is more probable if it has an average speed closer to that of the incoming path that is being traveled.

The speed profile data associated with a given segment may be used as a weighting factor together with the other factors described herein, or alone, to determine the overall probability that a path corresponding to the segment will be taken.

In preferred embodiments the speed profile data is based on data relating to the position of a plurality of devices associated with vehicles with respect to time. Such data may be referred to as vehicle "probe data", and any references to vehicle "probe data" herein, should be understood to refer to such positional data. As the devices are associated with respective vehicles, the position of the devices may be considered to correspond to the position of the vehicles. The method may extend to the steps of obtaining such positional data and/or using the data to determine the speed profile data and associating the data with respective road segment(s) to which it relates. The vehicle positional data may be of any of the forms described below in relation to the further embodiments in which the relative probability data is determined using historical probe data.

The speed profile data associated with a road segment is thus, at least in preferred embodiments, indicative of an average speed of travel for traversing the road segment during one or more, and preferably a plurality of, time periods. For example, the sped profile data can show how the average speed changes across a day, e.g. on a hourly basis. The relative probability that each outgoing path from the decision point will be taken is preferably determined using the average speed for the time period appropriate for the time at which the horizon is generated. For example, the time period matching the current time may be chosen or the time period matching the time at which the vehicle will reach the decision point (which will typically be the same as the horizon is intended to be a reflection of paths that may be traveled in the immediate future).

The invention is not limited to the use of speed profile data based on "probe data" in determining the probabilities of paths. For example, the method may comprise using data relating to the position of devices associated with vehicles with respect to time, i.e. vehicle probe data, and which is preferably obtained over a long period of time, e.g. weeks, months, etc (i.e. can be referred to as "historical data"), in determining the relative probabilities associated with taking each possible outgoing path at a decision point, or more generally to predicting one or more possible paths in the horizon.

The method may comprise determining the relative probability data using data indicative of a historic relative probability that each of the plurality of possible outgoing paths from the decision point has been taken in respect of the incoming path based on the aforementioned historical probe data. The method may comprise associating a relatively higher probability with a possible outgoing path that is associated with a relatively higher probability of having been selected based on the historical probe data. The relative probability that the paths were chosen historically may be used alone, or as a weighting factor together with other factors to determine the relative probability that paths will be chosen. The method may extend to determining the data indicative of the historic relative probability that each of the plurality of possible outgoing paths has been taken for the given incoming path. This may be carried out using historical data relating to the position of a plurality of devices associated with vehicles with respect to time in a portion of a road network comprising the decision point. The method may comprise using the positional data to determine a relative frequency with which vehicles have taken each of the plurality of possible outgoing paths from the decision point in respect of the incoming path. The historical probability data may be obtained using a count indicative of the number of times that each path is taken. In other embodiments the method may comprise obtaining the historic relative probability data from a database comprising data indicative of the frequency with which each of a plurality of possible outgoing paths has been taken at one or more, and preferably a plurality of, decision points of a road network for one or more, and preferably a plurality of, possible incoming paths of the or each decision point.

The historical probability may be time dependent. Thus, multiple historical probabilities may be determined for a given path in respect of different time periods. For example, a count indicative of the number of times that a given path is taken by a device associated with a vehicle in a given time frame may be determined and used in determining the historic probability for a path. The step of determining the probability that a given path will be selected using the historical positional data may comprise using historic probability data relating to devices associated with vehicles approaching the decision point in a time period corresponding to a current time or an expected time of arrival at the decision point.

The method may extend to obtaining the positional data. The step of obtaining the positional data may comprise receiving the data from devices associated vehicles, or may comprise accessing stored positional data. The method may thus comprise obtaining positional data relating to the movement of a plurality of devices associated with vehicles with respect to time in a road network, and filtering the data to obtain data relating to the travel of devices (and hence vehicles) along the or each of the plurality of possible outgoing paths from the decision point in respect of the given incoming path. The method may then comprise using the data to obtain a count of the number of times each possible outgoing path is taken, and determining a relative probability that each outgoing path was taken for the given incoming path.

In some embodiments the method comprises generating and/or providing a probability matrix, the probability matrix comprising, in respect of each of one or more decision points of a road network, data indicative of the relative probability that each of a plurality of possible outgoing paths at the decision point will be taken by a vehicle for each of one or more possible incoming paths, wherein the data indicative of the relative probability that a given possible outgoing path will be taken is based upon historical data relating to the position of multiple devices associated with vehicles with respect to time. Preferably the matrix comprises data indicative of the relative probability of each possible outgoing path being taken at one or more, and preferably a plurality of, decision points for each possible incoming path at the decision point. The method may comprise using such a probability matrix in determining the relative probability data for the different outgoing paths. The data of the probability matrix may be time dependent, and thus may be based on data relating to movements of devices associated with vehicles in a given time period.

The method may comprise storing such a probability matrix.

The present invention extends to a data product comprising such a probability matrix.

In accordance with a further aspect of the invention there is provided a data product comprising a probability matrix having, in respect of each of one or more decision points of a road network, data indicative of the relative probability that each of a plurality of possible outgoing paths at the decision point will be taken by a vehicle for each of one or more possible incoming paths, wherein the data indicative of the relative probability that a given possible outgoing path will be taken is based upon positional data relating to the movements of a plurality of devices associated with vehicles with respect to time.

The present invention in this further aspect may include any or all of the features described with reference to the other aspects of the invention to the extent they are not mutually exclusive.

In accordance with the invention in any of its aspects or embodiments involving a probability matrix, the step of providing the probability matrix may comprise obtaining positional data relating to the position of multiple devices associated with vehicles with respect to time in a road network, and filtering the positional data to obtain data indicative of the travel of vehicles along each possible outgoing path at the or each decision point of the road network, and with respect to the or each incoming path at the or each decision point. The filtered data may then be used to determine the relative probability that each of the plurality of paths at a decision point is taken.

In accordance with any embodiment using positional data, the method may extend to the step of obtaining the positional data relating to the movement of devices associated with vehicles. The step of obtaining the positional data may or may not comprise receiving the data from the one or more devices. In some arrangements the step of obtaining the data may comprise accessing the data, i.e. the data being previously received and stored. In arrangements in which the step of receiving the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

In embodiments the positional data is received at a central controller, such as a server system. The server may carry out the steps of using the positional data to determine a relative probability that each of a plurality of paths will be taken, or to determine the probability matrix.

The positional data used in accordance with the invention, at least in preferred embodiments, is collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the traffic control signal in accordance with the present invention. However, in preferred embodiments all positional data is associated with temporal data, e.g. a timestamp.

The devices are associated with vehicles. The position of a device can be assumed to correspond to the position of a vehicle. Thus references to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, e.g. in-built sensor or navigation apparatus, or may be a separate device associated with the vehicle, such as a portable navigation apparatus. Of course, the positional data may be obtained from a combination of different devices, or a single type of device, e.g. devices associated with vehicles.

The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

The steps of the methods described herein in any of its embodiments for generating a horizon are preferably carried out by a horizon generating subsystem of an ADAS. The ADAS is associated with a vehicle. The horizon generating subsystem may be provided by a suitable software module or modules, for example. The horizon generating subsystem is preferably in communication with one or more ADAS applications of a vehicle over a vehicle communication network, e.g. CAN bus.

The method may further comprise the step of storing the digital location based data, the vehicle data and/or driver data used in generating the horizon.

Digital location based data and/or data indicative of vehicle or driver parameters may be stored in any location provided that it is accessible for use in generating the horizon, e.g. to a subsystem for generating the horizon. A horizon generating subsystem may comprise means for storing the digital map data and/or vehicle or driver parameters used in generating the horizon, or such data may be stored separately to the horizon generating subsystem. Similarly horizon data, e.g. probability data, may be stored by a memory of the horizon generating subsystem or elsewhere.

Preferably the digital location based data, vehicle data and/or driver data, or, where determined, probability data is stored locally to the vehicle, e.g. on a memory of the ADAS.

The method may further comprise the step of using the determined horizon data, e.g. relative probability data for a plurality of outgoing paths associated with a decision point, to determine one or more predicted paths along which the vehicle can be expected to travel in the immediate future, e.g. one or both of a most probable path and at least one alternative path. The at least one alternative path preferably comprises at least a most probable alternative path. The method may comprise storing data indicative of the or each determined path. The one or more of the most probable outgoing path and the at least one alternative path are preferably outgoing paths at the decision point.

The step of generating the horizon may comprise determining a most probable path the vehicle may be expected to travel in the immediate future, and at least one alternative path, wherein the stored digital location-based data, vehicle data and/or driver data is used in determining the most probable path and/or the at least one alternative path.

In preferred embodiments in which relative probability data is determined for following each of a plurality of different possible outgoing paths at a decision point, the method may comprise determining a most probable outgoing path based on the probability data to be traveled by the vehicle from the decision point and/or determining the relative probabilities associated with one or more, and preferably a plurality of, alternative outgoing paths at the decision point using the probability data.

The methods and systems of the present invention are applicable whether or not the vehicle is following a pre-calculated route. In some embodiments the vehicle is a vehicle that is following a pre-calculated route, while in other embodiments the vehicle is a vehicle that is not following a pre-calculated route. In the latter case, the vehicle will be so-called "free driving".

The most probable outgoing path based on the relative probability data may be taken to be the most probable path to be traveled by the vehicle in embodiments in which the vehicle is not following a pre-calculated route.

As used herein, a "pre-calculated route" refers to a route that has been calculated between an origin and a destination. The route may be a route that has been pre-calculated by a navigation device associated with the vehicle. The navigation device may be an integrated or portable navigation device. The pre-calculated route is, in these embodiments, a route that has been calculated before the step of generating the ADAS horizon takes place. The method may further comprise the step of calculating a route that is to be followed by the vehicle between an origin and a destination prior to the step of generating the ADAS horizon, and the system may comprise means for calculating a route. The route may be pre-calculated before the vehicle commences travel, or may be a route that is calculated en-route, e.g. in the event of a deviation from an originally planned route. The method may comprise generating the ADAS horizon during travel of the vehicle along the pre-calculated route.

When the vehicle is following a pre-calculated route, the most probable path may be assumed to correspond to a portion of the pre-calculated route ahead. Thus, in embodiments in which the vehicle is following a pre-calculated route, the most probable path, and hence in embodiments the most probable outgoing path at the decision point, is assumed to correspond to the pre-calculated route, or the outgoing path corresponding to a portion thereof. This may or may not be the same as the most probable path indicated in preferred embodiments by the relative probabilities determined using the stored digital location-based data, vehicle data and/or driver data. In some embodiments in which one of the possible outgoing paths is known to correspond to a portion of a pre-calculated route, the method may comprise excluding that outgoing path from the set of plurality of outgoing paths whose relative probabilities are determined, or adjusting the calculations appropriately to ensure that this route is determined to be the most probable, as described above.

Where an outgoing path corresponds to a pre-calculated route, the method of the present invention in its preferred embodiments may be used to determine the relative probabilities that each of a plurality of outgoing paths other than that corresponding to the pre-calculated route will be taken at the decision point. These paths will provide alternative paths diverging from the pre-calculated route at the decision point. The present invention may then provide the ability to determine the relative probability that the vehicle will follow any of these alternative paths if the path of the vehicle diverges from the most probable path, i.e. that corresponding to the pre-calculated route at the decision point.

Determining of an alternative path emanating from a decision point as well as the most probable path is advantageous as the alternative path may be taken to be the most likely path to be taken if the vehicle diverges from the most probable (main) path. By including data indicative of the probability that different alternative paths may be taken at the decision point in the horizon, the ADAS may be able to continue to operate, and obtain data relating to the path, if the vehicle deviates from the expected main path, reducing the likelihood of "blind driving".

The method preferably comprises providing storing data indicative of the generated horizon and/or providing data indicative of the generated horizon over a vehicle bus to one or more ADAS applications of the vehicle (e.g. to the client side of the vehicle ADAS). Preferably these steps are carried out by a horizon generating subsystem of the ADAS.

The ADAS applications are for controlling respective subsystems of the vehicle. The one or more ADAS applications may be arranged for controlling one or more of: a braking function, the suspension, and the speed selection subsystem of the vehicle.

In embodiments in which the step of generating the horizon comprises determining one or more predicted paths, e.g. one or both of a most probable path and an alternative path, the method may comprise storing data indicative of the or each path and/or providing, e.g. transmitting such data over a vehicle bus to one or more ADAS applications of the vehicle for use by the one or more applications.

In embodiments in which data indicative of one or more predicted path is stored and/or provided over the bus, the data may comprise one or more attributes of the path, or data allowing such attributes to be determined. The attribute data may comprise, as needed, information identifying a location associated with the one or more attributes. For example, the attribute data may indicate the start and end of a portion of a road segment with high curvature.

Attribute data in respect of a path of a horizon refers to properties of the predicted path ahead of a vehicle's current position, and may include any or all of: a gradient of a segment, a curvature of a segment, a height of a segment, geometry of a segments, and a speed profile associated with the segment. Thus the attribute data may reflect inherent properties of the segment, or for example relate to expected vehicle speed data along the segment. The attribute data may be any attribute data that may be used by one or more ADAS application to implement one or more ADAS function. Thus, in some embodiments, the method may further comprise an ADAS application of the vehicle using the attribute data transmitted over the vehicle bus to carry out one or more of: issuing a speed warning, providing a speed recommendation, and automatically controlling the braking function of the vehicle.

Preferably such attribute data is provided at least in respect of a determined most probable path, and in some instances only for the most probably path. In these latter embodiments preferably data indicating the presence and/or location of one or more alternative paths along the most probably path is provided over the bus. The data indicative of the presence of the one or more alternative paths preferably comprises data indicative of the relative probability that the path will be taken at the decision point determined in accordance with the invention. In preferred embodiments relative probability data is provided for each alternative path for which relative probability data has been determined. In these embodiments, the ADAS applications would use the indication of the presence of an alternative path to request further data, e.g. attribute data, from the horizon generator when the vehicle is found to diverge from a most probable route.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

It should be noted that the phrase 'associated therewith' in relation to one or more segments should not be interpreted to require any particular restriction on data storage locations. The phrase only requires that the features are identifiably related to a segment. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE DRAWINGS

Various embodiments of the present invention will now be described, by way of example only, and with reference to the accompanying drawings in which.

DETAILED DESCRIPTION OF THE FIGURES

Figure 1:
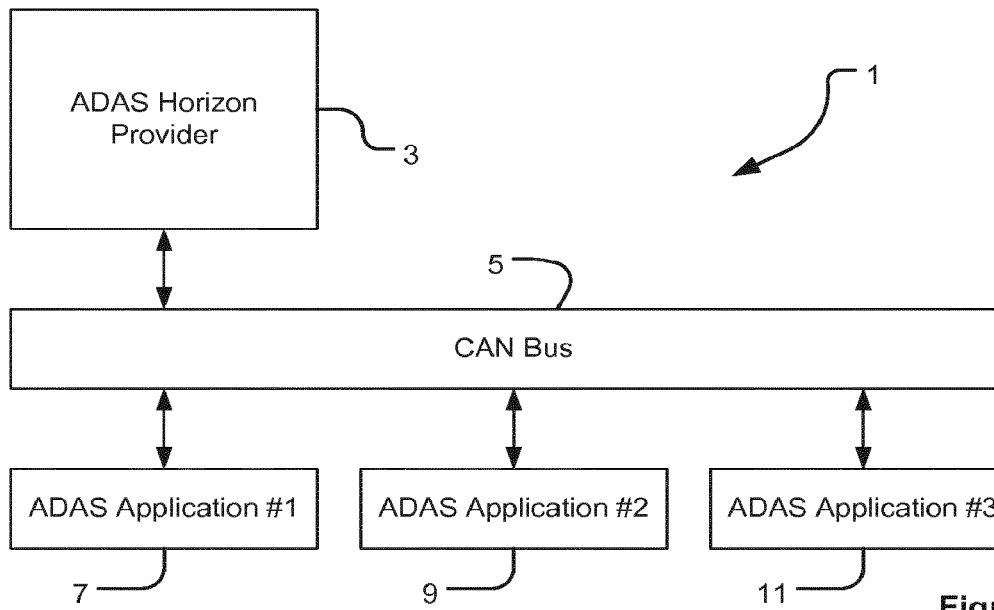
FIG. 1 shows the components of an exemplary ADAS system associated with a vehicle, which may be used to implement the methods of the present invention.

FIG. 1 is a schematic illustration of the components of an exemplary ADAS system associated with a vehicle, which may be used to implement the methods of the present invention.

The ADAS system 1 includes a horizon generating subsystem 3, which communicates horizon data over a Controller Area Network (CAN) bus 5 to a plurality of ADAS applications 7, 9 and 11. The ADAS applications are arranged to implement ADAS functionality in controlling respective subsystems of the vehicle. For example, the ADAS applications may be for controlling braking, speed selection and suspension vehicle subsystems respectively. In use, the respective ADAS applications filter the relevant data from the horizon data for use in controlling their associated vehicle subsystem.

The horizon providing subsystem 3 is arranged to generate data indicative of a driving horizon which is used by the ADAS applications (the "ADAS horizon"). The ADAS horizon is an electronic horizon comprising data indicative of one or more predicted paths ahead of a current position of a vehicle that it may be expected the vehicle will travel along. The ADAS horizon is based on digital map data.

In order to provide ADAS functions, the ADAS applications require information about the road ahead, and its attributes, e.g. gradient, curvature, speed limit, etc. The ADAS horizon provides this information in respect of the one or more predicted paths up to a given distance ahead of the current position. The distance ahead may be 200 m. The ADAS horizon data that is transmitted over the vehicle bus 5 to the ADAS applications contains at least attribute data of the most probable path (up to a certain, often predetermined, extent ahead of the vehicle). The ADAS horizon generating subsystem 3 provides the attribute data in relation to any attributes that may be required by the different ADAS applications 7, 9, 11, or data allowing such attribute data to be requested by the applications, and the respective subsystems may then select or request the attribute data relevant to their operation. For example, data relating to the curvature of the path ahead may be selected by an ADAS application for controlling braking of the vehicle. The attribute data may be provided in fields to facilitate filtering of relevant data by the ADAS applications.

The horizon generating subsystem 3 is arranged to determine a horizon in accordance with any of the embodiments described herein, and to cause the horizon data to be transmitted over the vehicle bus to the ADAS applications. The horizon generating subsystem 3 may be arranged to be in communication with a memory for storing generated horizon data. It will be appreciated that as described below, not all horizon data determined is necessarily transmitted at a given time over the vehicle bus. For example, data relating to alternative paths rather than a determined most probable path may be determined and stored, but not transmitted over the bus unless required to avoid overloading the ADAS applications. The ADAS horizon generating subsystem is also in communication with digital map data. This is used in determining the horizon. In some arrangements the ADAS horizon generating subsystem may be implemented using a software module separate from a digital map data store, or may otherwise include means storing such data. Thus the digital map data providing and horizon generating functions may be implemented separately or as part of a combined system.

Figure 2:
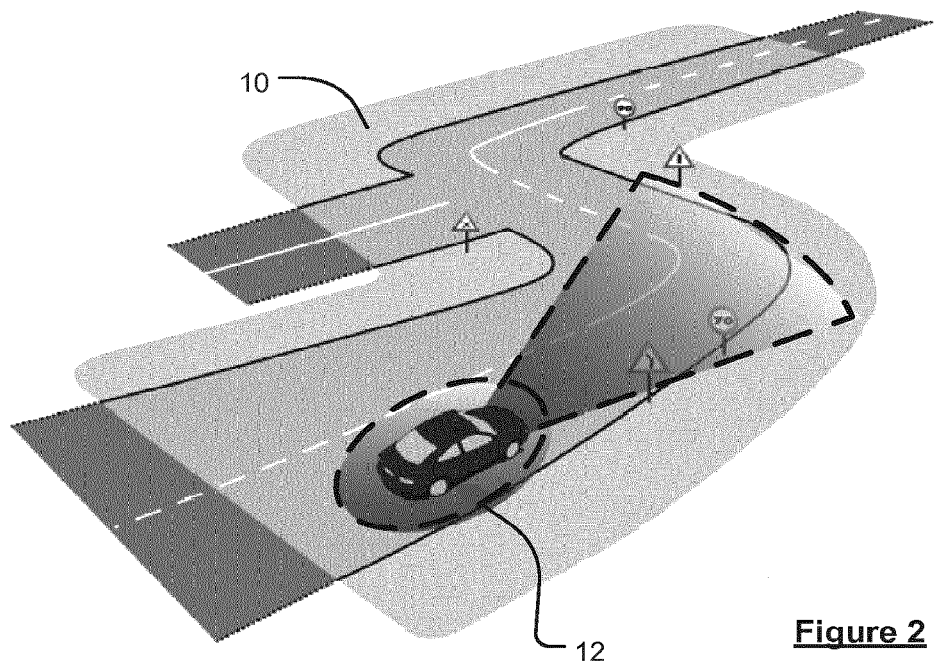
FIG. 2 schematically illustrates the concept of an ADAS horizon.

FIG. 2 schematically illustrates the concept of an ADAS horizon. It may be seen that the electronic ADAS horizon 10 provides the ADAS with information about the path ahead in a similar manner to a vehicle sensor horizon 12, but may provide information about the path beyond the limit of a vehicle sensor horizon, e.g. around a corner, and regardless of weather conditions, as the ADAS horizon is based upon digital map data.

At various points in a road network there will be nodes, i.e. decision points at which the vehicle may have a choice of possible outgoing paths. The present invention relates, in embodiments at least, to a method of more reliably determining the most probable path at a decision point, and the relative probability that each of a plurality of alternative paths may be taken. Some exemplary methods will be described by reference to a decision point that is a junction.

At a given time, a vehicle has a current position defined on a particular road segment. It may be assumed that the continuation of the segment forms the most probable path until the first junction is reached. At the first junction the method of the present invention may be used to determine the relative probability that each of the possible outgoing paths may be taken. This enables a determination to be made as to which of the plurality of outgoing paths forms the continuation of the main path, if this is not already known (e.g. from a pre-calculated route), and which form alternative paths. A determination is also made as to the relative likelihood that one of these alternative paths may be taken.

In order to determine this, a probability is determined for each outgoing path at a decision point indicative of the likelihood that the path will be chosen in preference of all other possible outgoing paths. In this process, certain outgoing paths which are considered not to be possible outgoing paths may be excluded from the determination, e.g. they may be designated "restricted" paths. These may be excluded by assigning each a probability of "0".

The way in which the probability for each outgoing path is determined is dependent upon whether the vehicle is following a pre-calculated route.

Where no route has been pre-calculated, a probability is determined for each outgoing path at a decision point indicative of the likelihood that the path will be taken to the detriment of all other outgoing paths. This is done using an algorithm operating in one of the manners described below.

The most probable path may be determined as the most probable path continuing from the decision point. Each other outgoing path may then be classified as an alternative path.

Data is stored indicative of the identity and probability associated with the determined most probable path and each alternative path. This data is associated with data indicative of the junction to which it relates.

When a route is pre-calculated, it may be assumed that the most probable outgoing path at the decision point is the outgoing path from the junction which is along the pre-calculated route. This may override any restriction of the path. The remaining non-restricted outgoing paths are determined to be alternative paths.

Probabilities are determined for each of the other paths as described for the embodiment with no pre-calculated route, but each probability is divided by two to avoid the path being more probable than the path corresponding to the pre-calculated route, but maintaining the ranking of the other paths. The probability of the path corresponding to the pre-calculated route is taken to be 100% minus the sum of the probabilities of the other outgoing paths.

Data is stored indicative of the identity and probability of each alternative path associated with data indicative of the junction to which this relates.

The probability that a given possible outgoing path from the junction will be taken may be calculated using a suitable algorithm. Some embodiments according to which an algorithm may operate will now be described.

In one embodiment the probability is a factor of the angle a an outgoing path makes with the line of the path along which the vehicle is expected to enter the junction, i.e. the expected incoming path, and the road class c of the outgoing path.

For an intersection with n outgoing paths, we will have n probabilities, between which we can have the following relation:

$$P_1\alpha_1 = P_2\alpha_2 = \ldots = P_i\alpha_i = \ldots = P_n\alpha_n$$

where $\alpha$ is a coefficient for an outgoing path, and is defined by:

$$\alpha_i = a_i + \frac{k}{N_c - c_i}$$

where:
- $a_i$ is the angle between the ith outgoing path and the incoming path;
- $c_i$ is the road class of the ith outgoing path;
- $N_c$ is the total number of road classes; and
- k is a coefficient, typically determined empirically.

Given the first relation, we can use one of the probabilities to express all the others:

$$P_j = \frac{\alpha_i}{\alpha_j} P_i$$

And we know that the sum of all the probabilities is 1, thus:

$$P_1 + P_2 + \ldots + P_i + \ldots + P_n = 1$$

From the last two relations we obtain:

$$\alpha_i P_i \left( \frac{1}{\alpha_1} + \frac{1}{\alpha_2} + \ldots + \frac{1}{\alpha_i} + \ldots + \frac{1}{\alpha_n} \right) = 1$$

And therefore each probability can be calculated as:

$$P_i = \frac{1}{\alpha_i \left( \frac{1}{\alpha_1} + \frac{1}{\alpha_2} + \ldots + \frac{1}{\alpha_i} + \ldots + \frac{1}{\alpha_n} \right)}$$

The probability coefficient $\alpha$ mentioned above influences the value of the probability. The constant k may be used to fine tune the formula, since, by varying its value, the respective weight accorded to road class and angle can be varied. Of course, the probability could be based upon angle without road class if desired.

In these embodiments the probability function is based on the assumption that the continuation of the incoming path (unless a pre-calculated route exists) will be the straightest path or most similar path in terms of class to the currently traveled path.

Figure 3A:
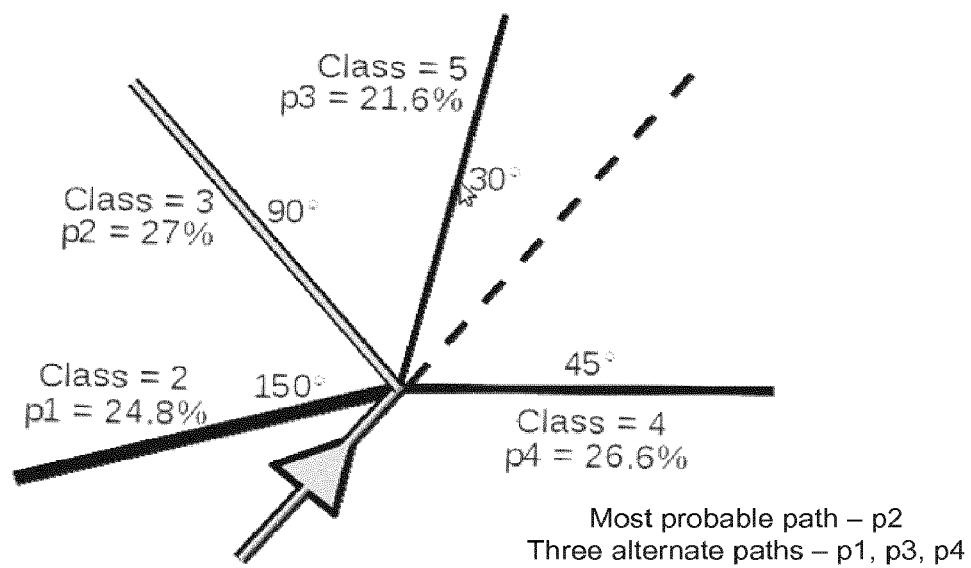
FIG. 3A illustrates the result of applying a method for determining the relative probability of outgoing paths in accordance with the invention to a junction with four outgoing paths, where no route has been calculated.

An example of the results of applying the algorithm to a junction with four outgoing paths, where no route has been calculated, is shown in FIG. 3A. The incoming path is shown with an arrow pointing toward the junction. Here the probabilities based on angle and road class according to the above formula resulted in path 2 (p2) being determined as the most probable outgoing path. The remaining paths p1, p3 and p4 form alternative outgoing paths with the stated probabilities. The angles in FIG. 3A are with respect to the continuation of the line of the incoming path shown in dotted lines.

Figure 3B:
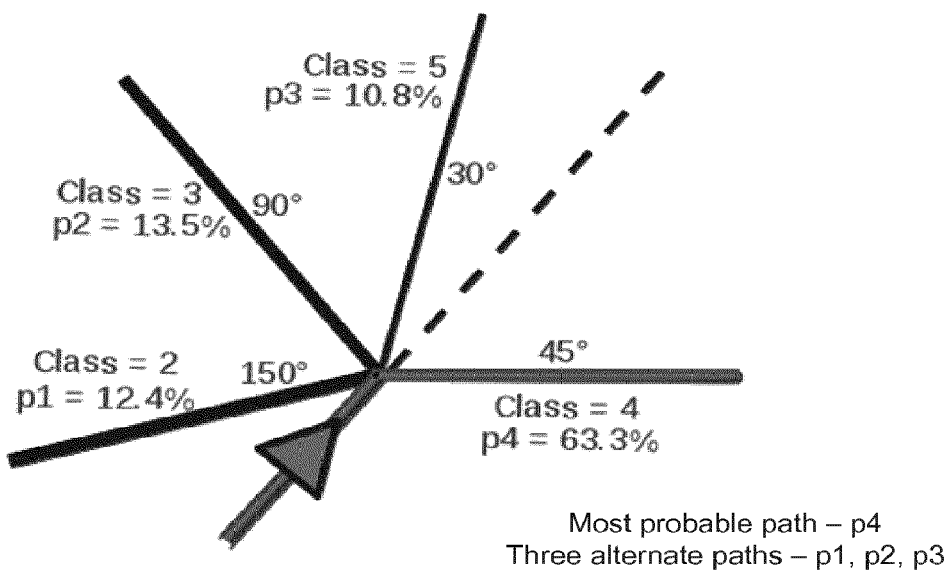
FIG. 3B shows the corresponding results where there is a pre-calculated route.

FIG. 3B shows the corresponding results where there is a pre-calculated route, such that the follow up of the incoming path is known to be path 4 (p4) outgoing from the junction. This shows the way in which the probabilities associated with the outgoing paths will be adjusted.

Figure 4A:
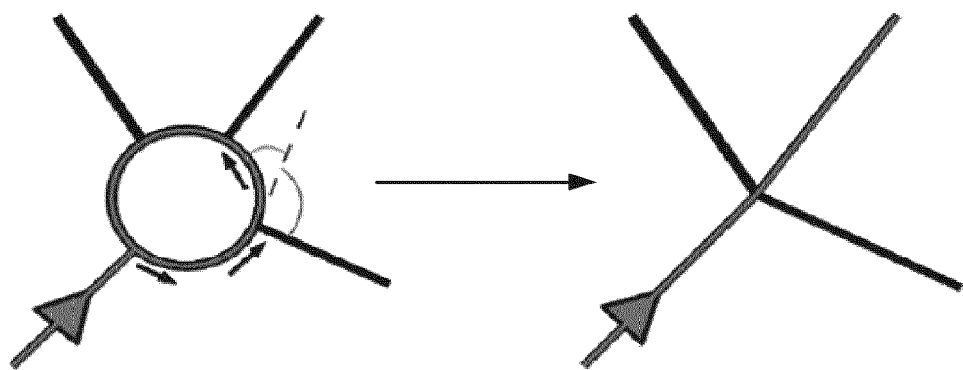
FIG. 4A illustrates the way in which the methods of the present invention may be applied to determining probabilities of paths at a roundabout.

While they have been described by reference to an intersection in the form of a junction, the methods of the invention may be applied to other types of decision point, such as roundabouts or even plural junctions. In a roundabout it has been found that the loop defining the path around the roundabout may be disregarded, and the roundabout may be treated as a single intersection having outgoing paths corresponding to each (non restricted) exit, including an outgoing path corresponding to the opposite carriageway of the incoming path, i.e. representing a full turn around the roundabout, with a sum of probabilities being 1. The way in which the roundabout may be considered is illustrated in FIG. 4A.

Figure 4B:
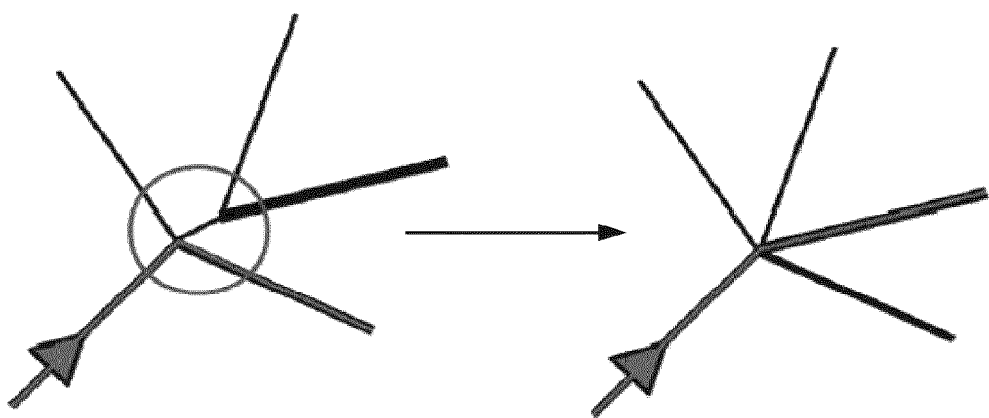
FIG. 4B illustrates a way in which the methods of the present invention may be applied to a plural junction.

FIG. 4B illustrates a way in which the methods may be applied to a plural junction. Here it may be seen that the two proximate junctions may be approximated as a single junction for the purposes of determining probabilities. All non restricted outgoing paths leaving the two junctions are considered to leave the single junction approximating the plural junction, and the sum of their probabilities and is taken as 1.

In addition to the above embodiments in which the probabilities of outgoing paths are determined based on the angle of the path and the road class of the path, various other factors may alternatively or additionally be taken into account when determining a probability for each outgoing path. These may be taken into account by suitable adaptation of the probability function in equation 1 to introduce further terms, which may be weighted as desired as known in the art.

For example, the probability of a given outgoing path may additionally be based on whether a manoeuvre from an incoming path to an outgoing path is weighted either more positively or negatively that typically expected in the digital map data. For example, a complicated manoeuvre at a junction may also be a common manoeuvre, and is marked as a special case in the digital map data for the junction. Conversely, a seemingly simple manoeuvre may in reality be dangerous or simply not often used, and is also marked appropriately in the digital map data for the junction.

The probability of a given outgoing path may additionally be based on an average speed associated with the road segment defining the path as indicated by speed profile data associated with the segment. The speed profile is indicative of an average speed of travel along the segment. As known in the art, digital map data may include speed profile data associated with each road segment, based on historical speeds of vehicles traversing the segment. Such data may be based on vehicle probe data, i.e. data indicative of the position of vehicles with respect to time, e.g. time stamped position data. The speed profile data may be in respect of a given time period. In some embodiments the probability that a given outgoing path is taken may additionally or alternatively be based upon the average speed associated with the segment as indicated by the speed profile data, such that a higher probability will be assigned to a road segment associated with a higher average speed. The average speed associated with a segment may be indirectly indicative of its road class. Thus the average speed may be used as an alternative to the road class in the probability determination above.

In other embodiments the method may, alternatively or additionally, comprise comparing the average speed associated with the road segment defining an outgoing path as indicated by the speed profile data to the current speed of travel of the vehicle along the incoming path as it approaches the junction. A relatively higher probability may be assigned to an outgoing path having an average speed which is closer to the current speed of the vehicle. In other words it may be assumed that the vehicle will continue along a path which requires the smallest change in speed.

In other embodiments the probability may, alternatively or additionally, be based on a turn history database that is built up for an individual driver in respect of different junctions of the road network. Each time that the driver passes through a given junction in the road network, the ADAS of the vehicle (or any other suitable electronic device, such as a navigation device) may store data indicative of the incoming and outgoing path taken, and add this to a database. In this way, for each junction, data may be collected representing a count of the number of times each type of turn has been taken by the driver at a given junction. The turn will represent the type of turn relative to the incoming path, e.g. that path 4 is taken when incoming path is path 1, and may be based on data relating to the incoming and outgoing paths taken by the driver. This may be used to determine a historical probability that the driver has taken a given type of turn at a given junction. When the driver approaches the junction this data may be used in assigning a probability to each of the possible outgoing paths based on the probability that the path was chosen as an outgoing path based on the current incoming path previously by the driver. The turn history database may comprise a quantitative probability factor for each type of turn at the junction, or a relative rank of each type of turn being taken.

As will be appreciated, whilst such a turn history database may be built for a particular driver (potentially regardless of vehicle), in other embodiments a turn history database can be built in a similar manner for an individual vehicle, regardless of the person driving the vehicle.

A similar approach may, alternatively or additionally, be used based on vehicle probe data (collected over a relatively long period of time, e.g. weeks, months, etc), i.e. positional data with respect to time, not specific to the individual driver. The historical probe data may be used in a similar manner to build up a probability matrix in respect of paths being taken at each of a plurality of junctions in the road network. Probe data relating to the movement of vehicles in the network may be filtered to extract probe traces passing through each junction. Each trace may be assigned to a bin depending upon the incoming and outgoing paths used. Thus there may be a bin for each combination of an outgoing and incoming path at a junction. The data may then be used to obtain a count for each path through the junction, e.g. from a given incoming path to a given outgoing path. A probability may be determined in respect of each outgoing path being taken for a given incoming path. When the vehicle approaches a given junction, the relevant data may be obtained from the database representing the probability that each outgoing path may be taken based on the current incoming path. In this way, these probabilities for each outgoing path based on historical probe data may be used in determining the probability associated with each outgoing path, alone, or in combination with other factors as outlined above.

In accordance with the embodiments of the invention that will be described, probabilities associated with a most probable path and multiple alternative outgoing paths emanating from the junction are determined by the horizon generating subsystem. The horizon generating subsystem stores data indicative of each path and its probability.

The horizon generating subsystem may then provide data indicative of each path and its associated probability over a vehicle bus to the one or more subsystems. There are various manners in which this may be done.

It is desirable to reduce the amount of horizon data transmitted over the CAN bus. For this reason, in certain embodiments, only attribute data for the most probable path is transmitted over the vehicle bus, together with data identifying the location of any such attributes, e.g. relative to the current position of the vehicle. The most probable path may be referred to as the "main path". This is the most probable future trajectory of the vehicle up to the limit of the ADAS horizon, as determined by the ADAS horizon providing subsystem 3.

At each decision point along the main path there will be a possible alternative path that the vehicle may take if it diverges from the main path. An alternative path that emanates from a decision point along the main path may be referred to as a first level sub path beneath the main path. A path branching off from the first level sub path is referred to as a second level sub path and so on. This concept is illustrated by reference to FIGS. 5A, 5B and 5C.

Figure 5A:
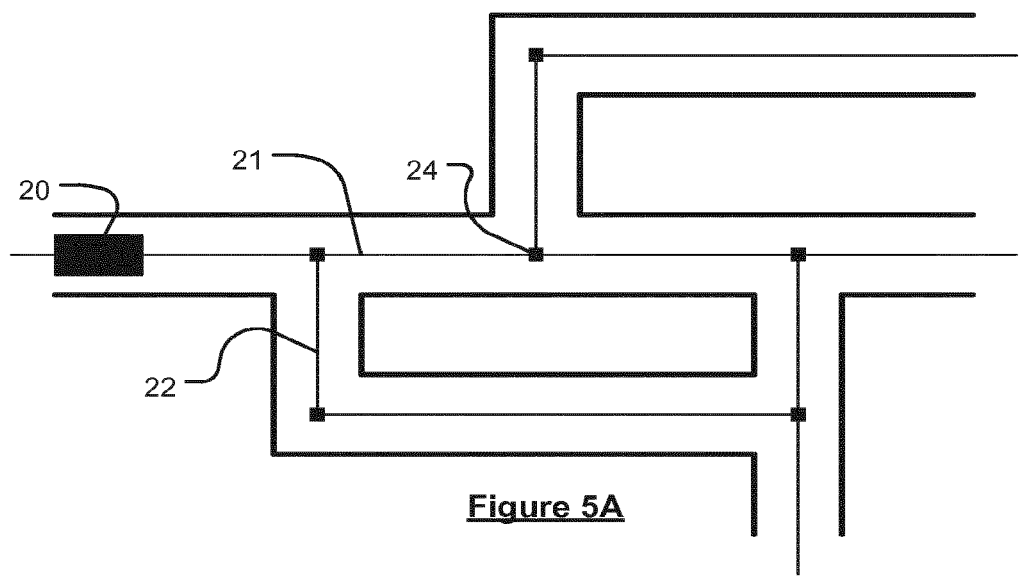
FIG. 5A illustrates a portion of a road network ahead of a current position of a vehicle up to a distance in the direction of travel defined by a limit of the distance that the ADAS horizon will extend once generated.

FIG. 5A illustrates a portion of a road network ahead of a current position 20 of a vehicle up to a distance in the direction of travel defined by a limit of the distance that the ADAS horizon will extend once generated, e.g. 200 m. The road network is made up of a plurality of links or road segments, e.g. 21, 22, connected by nodes e.g. 24. The generation of the ADAS horizon considers possible paths, i.e. trajectories, that may be taken by the vehicle through the road network rather than individual road segments and nodes.

Figure 5B:
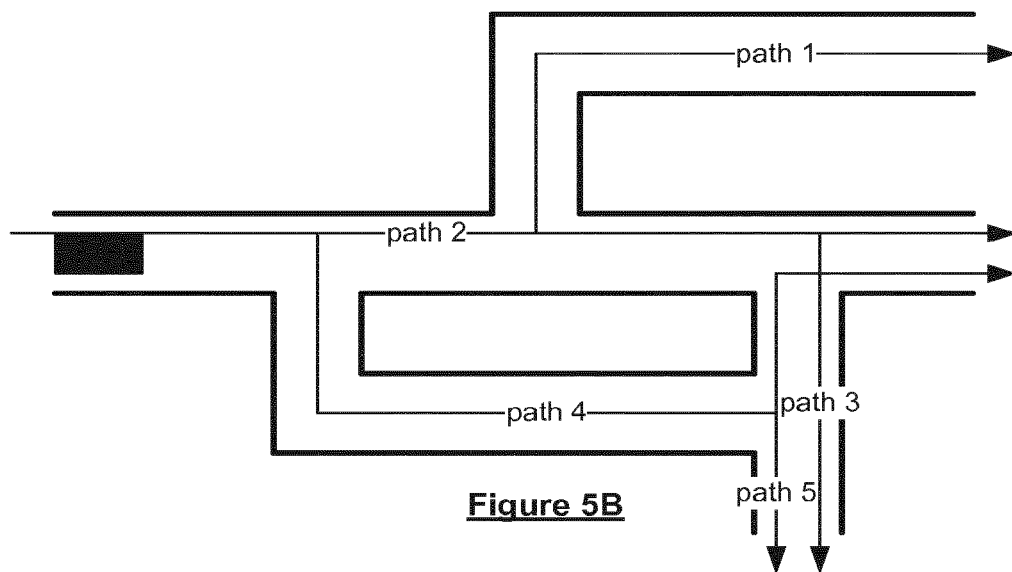
FIG. 5B illustrates a number of paths which may be taken through the network.

FIG. 5B illustrates a number of paths which may be taken through the network shown in FIG. 5A. Each of the paths has a probability that the driver will follow it. This may be used to determine the most probable or main path that can be expected to be followed, and in many cases at least a first level sub path. The first level sub path may be considered to be an alternative path that may be taken at a given decision point along the main path.

Figure 5C:
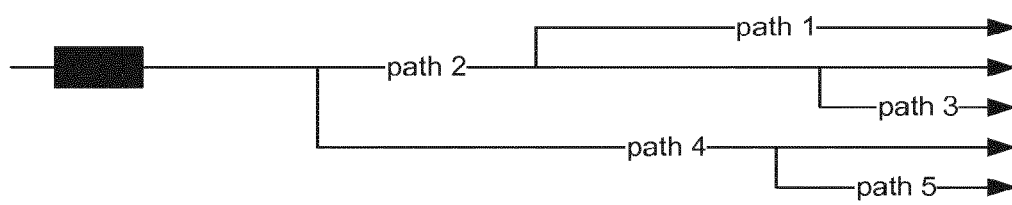
FIG. 5C illustrates the way in which these paths may be represented to an ADAS application.

FIG. 5C illustrates the way in which these paths may be represented to an ADAS application. This represents schematically the relationship between the possible paths through the road network. Path 2 forms the most probable or main path in this case, and paths 1, 3 and 4 are first level sub paths diverging from the main path at different respective decision points along its length. Path 5 is a second level sub paths diverging from the first level sub paths 4 at a decision point along its length.

Figure 6A:
FIGS. 6A, 6B and 6C illustrate different ways in which information about predicted paths in the road network may be represented to the ADAS applications.
Figure 6B:
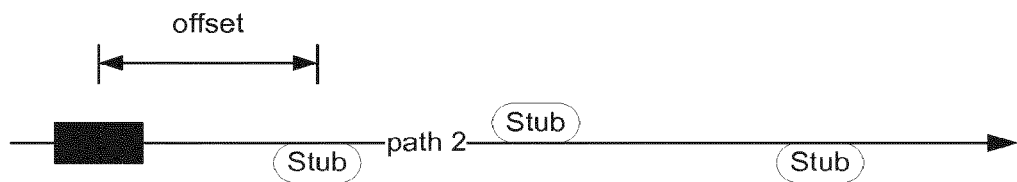

The ADAS horizon generating subsystem 3 will determine the most probable, i.e. main path 2. As discussed above, in some simple systems, the ADAS horizon generating subsystem could just transmit attribute data for this main path over the vehicle bus. An example of such a transmitted horizon is shown in FIG. 6A. However, if the vehicle diverges from the main path, then the system will be left "blind" until a new most probable or main path is generated. Thus, it is beneficial for the horizon generating subsystem 3 to also determine at least the first order sub paths diverging from the main path.

Where one or more first level sub paths are determined, the horizon generating subsystem 3 may provide attribute data for the or each first level sub path over the vehicle bus to the ADAS applications, together with the corresponding data for the main or most probable path. However, to reduce the amount of data transmitted, in some arrangements only minimal data is transmitted regarding the presence of a first level sub path and its location along the main path. This may be done by providing a suitable stub marking a position along the main path at which a first level sub path is present. The stub position may be defined by reference to an offset from the start of the currently traversed road segment defining the main path. FIG. 6B illustrates the form of a possible horizon to be transmitted in this case. If the ADAS applications require additional data regarding the course and properties of a first level sub path, e.g. if the vehicle diverges from the main path, then the stub may be used to request the attribute data the first level sub path from the ADAS horizon provider, which may then be transmitted over the vehicle bus to the ADAS applications. Again, the ADAS applications would be left temporarily blind in this situation.

Figure 6C:
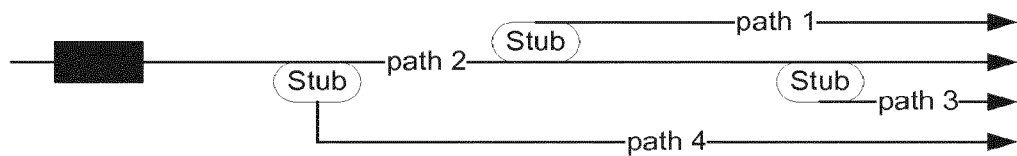

Another option is shown in FIG. 6C. Here attribute data is transmitted relating to the each of the first level sub paths as well as relating to the main path. This may enable the ADAS applications to continue to operate even if the vehicle starts to travel along one of the first level sub paths rather than the main path. Any second level sub paths may be transmitted as stubs as with the first level sub paths in the FIG. 6B arrangement. In preferred embodiments of the invention information about the first and second level sub paths is determined and transmitted over the vehicle bus.

When a most probable and one or more alternative path at a decision point is determined in accordance with the invention, the horizon provider may represent the determined paths in any of these manners to the ADAS applications. Each alternative outgoing path at the decision point, e.g. junction may be represented as a first level sub path emanating from the main or most probable path at the junction.

In preferred embodiments the horizon provider provides attribute data for the main or most probable path at the junction, together with stub data indicative of the position of each alternative outgoing path associated with the junction along the main path over the vehicle bus. The stub data may include data indicative of each alternative outgoing path that exists at the junction and its probability where multiple paths exist. This data is included in horizon data transmitted over the vehicle bus to the ADAS applications. The probability data ensures that the new path may be more readily identified if the vehicle diverges from the main path. As in preferred embodiments only stub data indicative of the presence of each alternative path and its probability is transmitted, the amount of data needing to be transmitted over the vehicle bus is reduced.

The data transmitted regarding the main path may include any of the following data about attributes of the road segment or segments making up the determined portion of the main path: speed limit, recommended speed limit where no legal speed limit is associated with the road segment, functional road class, form of way, gradient, curvature, etc.

The data may be used by the ADAS applications as desired. In preferred embodiments the received horizon data is used to carry out at least one of; providing an overspeed warning, adjusting a current speed, or operating a braking subsystem of the vehicle. The ADAS applications may control speed based on a curvature, gradient or speed limit associated with the most probable or main path.

Although the present invention has been described with reference to preferred embodiments, it will be understood by those skilled in the art that various changes in form and detail may be made without departing from the scope of the invention as set forth in the accompanying claims.

The invention claimed is:

1. A method of generating a horizon for use in an Advanced Driver Assistance System (ADAS) of a vehicle using stored digital map data, wherein the digital map data comprises a plurality of segments representative of roads of a road network, each segment being associated with data indicative of one or more attributes of the road represented by the segment, wherein one of the attributes is speed profile data that is indicative of an average speed of travel for traversing the road during one or more time periods, said method comprising:
    determining data indicative of a relative probability that each of a plurality of possible outgoing paths associated with a decision point of the road network will be taken by the vehicle using at least the average speed for the time period appropriate for the time at which the horizon is generated from the speed profile data associated with the segments defining the respective outgoing paths, wherein the relative probability for each outgoing path is a respective portion of a specified total probability value for the decision point and the probabilities for each outgoing path sum to the specified total probability value;
    determining one or more predicted paths that the vehicle is expected to travel in the immediate future at the decision point using the data indicative of the relative probability;
    generating the horizon using the one or more predicted paths; and
    providing data associated with the generated horizon to one or more applications, the data associated with the generated horizon configured to be used by the one or more applications when controlling corresponding vehicle subsystems.

2. The method of claim 1, further comprising obtaining a current speed of the vehicle as it approaches the decision point, and wherein the data indicative of the relative probability is determined by comparing the current vehicle speed with the average speed data indicated by speed profile data associated with the segment representing each outgoing path, wherein a relatively higher probability is associated with an outgoing path providing a relatively smaller difference in speed compared to the current vehicle speed.

3. The method of claim 1, wherein a relatively higher probability is associated with an outgoing path having a relatively higher average speed for the time period.

4. The method of claim 1, wherein the one or more predicted paths comprise one or both of a most probable path and an alternative path.

5. The method of claim 1, wherein the time period appropriate for the time at which the horizon is generated is the time period including: the current time; or an expected time at which the road represented by the segment is to be traversed.

6. The method of claim 1, wherein the data indicative of the one or more attributes of the road represented by each segment includes data indicative of other attributes, including one or more of: a geometry of the road; a gradient of the road; an angle of the road; a road class of the road; a speed limit associated with the road; and vehicle flow data indicative of vehicle flow along the road, and wherein determining the data indicative of the relative probability that each of a plurality of possible outgoing paths associated with a decision point of the road network will be taken by the vehicle comprises using one or more of the other attributes associated with the segments defining the respective outgoing paths.

7. The method of claim 1, wherein the data indicative of the relative probability is determined using data indicative of an angle defined between the possible outgoing path and the incoming path, and wherein a possible outgoing path is relatively more probable when the outgoing path is associated with a relatively lower angle relative to the incoming path.

8. The method of claim 1, further comprising ranking the plurality of possible outgoing paths according to the likelihood that the vehicle may be expected to travel along the paths and/or determining a probability factor in respect of each path indicative of the relative probability that the path will be taken.

9. The method of claim 1, wherein generating the horizon is carried out by a horizon generating subsystem of the ADAS, and wherein providing the data associated with the generated horizon to the one or more applications comprises the horizon generating subsystem providing the data associated with the generated horizon over a vehicle bus to one or more ADAS applications of the vehicle.

10. A non-transitory computer readable medium storing instructions that, when executed by a processor, cause the processor to perform a method for generating a horizon for use in an Advanced Driver Assistance System (ADAS) of a vehicle using stored digital map data, wherein the digital map data comprises a plurality of segments representative of roads of a road network, each segment being associated with data indicative of one or more attributes of the road represented by the segment, wherein one of the attributes is speed profile data that is indicative of an average speed of travel for traversing the road during one or more time periods, said method comprising:
    determining data indicative of a relative probability that each of a plurality of possible outgoing paths associated with a decision point of the road network will be taken by the vehicle using at least the average speed for the time period appropriate for the time at which the horizon is generated from the speed profile data associated with the segments defining the respective outgoing paths, wherein the relative probability for each outgoing path is a respective portion of a specified total probability value for the decision point and the probabilities for each outgoing path sum to the specified total probability value;

determining one or more predicted paths that the vehicle is expected to travel in the immediate future at the decision point using the data indicative of the relative probability;

generating the horizon using the one or more predicted paths; and providing data associated with the generated horizon to one or more applications, the data associated with the generated horizon configured to be used by the one or more applications when controlling corresponding vehicle subsystems.

11. A system for generating a horizon for use in an Advanced Driver Assistance System (ADAS) of a vehicle using stored digital map data, wherein the digital map data comprises a plurality of segments representative of roads of a road network, each segment being associated with data indicative of one or more attributes of the road represented by the segment, wherein one of the attributes is speed profile data that is indicative of an average speed of travel for traversing the road during one or more time periods, said system comprising:

at least one processor, the at least one processor configured to:

determine data indicative of a relative probability that each of a plurality of possible outgoing paths associated with a decision point of the road network will be taken by the vehicle using at least the average speed for the time period appropriate for the time at which the horizon is generated from the speed profile data associated with the segments defining the respective outgoing paths;

determine one or more predicted paths that the vehicle will be expected to travel in the immediate future at the decision point using the data indicative of the relative probability;

generate the horizon using the one or more predicted paths; and provide data associated with the generated horizon to one or more applications, the data associated with the generated horizon configured to be used by the one or more applications when controlling corresponding vehicle subsystems.

12. The system of claim 11, wherein the at least one processor is further configured to:

obtain a current speed of the vehicle as it approaches the decision point, and wherein the data indicative of the relative probability is determined by comparing the current vehicle speed with the average speed data indicated by speed profile data associated with the segment representing each outgoing path, wherein a relatively higher probability is associated with an outgoing path providing a relatively smaller difference in speed compared to the current vehicle speed.

13. The system of claim 11, wherein a relatively higher probability is associated with an outgoing path having a relatively higher average speed for the time period.

14. The system of claim 11, wherein the system is configured to provide data associated with the generated horizon over a vehicle bus to one or more ADAS applications of the vehicle for use by the one or more ADAS applications in controlling one or more vehicle subsystems.

15. The non-transitory computer readable medium of claim 10, wherein determining the data indicative of the relative probability that each of the plurality of possible outgoing paths associated with the decision point of the road network will be taken by the vehicle comprises:

comparing a current speed of the vehicle as it approaches the decision point with the average speed data indicated by speed profile data associated with the segment representing each outgoing path, wherein a relatively higher probability is associated with an outgoing path providing a relatively smaller difference in speed compared to the current vehicle speed.

16. The non-transitory computer readable medium of claim 10, wherein a relatively higher probability is associated with an outgoing path having a relatively higher average speed for the time period.

17. The non-transitory computer readable medium of claim 10, wherein the one or more predicted paths comprise one or both of a most probable path and an alternative path.

18. The non-transitory computer readable medium of claim 10, wherein the time period appropriate for the time at which the horizon is generated is the time period including one of the current time or an expected time at which the road represented by the segment is to be traversed.

19. The non-transitory computer readable medium of claim 10, wherein the data indicative of the one or more attributes of the road represented by each segment includes data indicative of other attributes, including one or more of: a geometry of the road; a gradient of the road; an angle of the road; a road class of the road; a speed limit associated with the road; and vehicle flow data indicative of vehicle flow along the road, and wherein determining the data indicative of the relative probability that each of a plurality of possible outgoing paths associated with a decision point of the road network will be taken by the vehicle comprises using one or more of the other attributes associated with the segments defining the respective outgoing paths.

* * * * *